(12) United States Patent
Miyahara et al.

(10) Patent No.: US 10,618,011 B2
(45) Date of Patent: Apr. 14, 2020

(54) PACKAGE, METHOD FOR STORING OR TRANSPORTING SUB-NANO MEMBRANE STRUCTURE, AND SUB-NANO MEMBRANE STRUCTURE

(71) Applicant: NGK INSULATORS, LTD., Nagoya-Shi (JP)

(72) Inventors: Makoto Miyahara, Nagoya (JP); Makiko Ichikawa, Nagoya (JP); Kenji Yajima, Nagoya (JP); Katsuhiro Tokura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 339 days.

(21) Appl. No.: 15/479,631

(22) Filed: Apr. 5, 2017

(65) Prior Publication Data
US 2017/0203254 A1 Jul. 20, 2017

Related U.S. Application Data

(63) Continuation of application No. PCT/JP2015/081056, filed on Nov. 4, 2015.

(30) Foreign Application Priority Data

Nov. 5, 2014 (JP) .................. 2014-225087

(51) Int. Cl.
*B65D 81/26* (2006.01)
*B01D 65/00* (2006.01)
(Continued)

(52) U.S. Cl.
CPC ......... *B01D 65/006* (2013.01); *B01D 63/066* (2013.01); *B01D 67/0097* (2013.01);
(Continued)

(58) Field of Classification Search
CPC .... B65D 65/38; B65D 81/22; B65D 81/2069; B65B 11/50; B65B 19/34; B65B 31/00;
(Continued)

(56) References Cited

U.S. PATENT DOCUMENTS 3,322,266 A * 5/1967 Lontz .................... B01D 61/30
206/205
3,620,679 A * 11/1971 De Vaughn ............... B01L 3/50
422/549
(Continued)

FOREIGN PATENT DOCUMENTS

CN 102066244 A 5/2011
JP H08-310565 A 11/1996
(Continued)

OTHER PUBLICATIONS

English Translation of Written Opinion, International Application No. PCT/JP2015/081056, dated May 18, 2017 (5 pages).
(Continued)

*Primary Examiner* — Luan K Bui
(74) *Attorney, Agent, or Firm* — Burr & Brown, PLLC (57) ABSTRACT

A package comprises an airtight container having an oxygen permeability of less than or equal to 15 ml/m²dMPa and water vapor permeability of less than or equal to 2 g/m²d, and a sub-nano membrane structure accommodated in the airtight container. The sub-nano membrane structure having a porous support and a sub-nano membrane. The sub-nano membrane formed on the porous support and having an average pore diameter of less than or equal to 1 nm.

10 Claims, 7 Drawing Sheets

(51) Int. Cl.
  *B65B 11/50* (2006.01)
  *B65B 31/00* (2006.01)
  *B01D 67/00* (2006.01)
  *B65B 19/34* (2006.01)
  *B01D 69/12* (2006.01)
  *B01D 63/06* (2006.01)
  *B01D 71/02* (2006.01)
  *B65D 65/38* (2006.01)
  *B65D 81/20* (2006.01)
  *B65D 81/22* (2006.01)
  *B01D 53/22* (2006.01)

(52) U.S. Cl.
  CPC .......... *B01D 69/12* (2013.01); *B01D 71/028* (2013.01); *B65B 11/50* (2013.01); *B65B 19/34* (2013.01); *B65B 31/00* (2013.01); *B65D 65/38* (2013.01); *B65D 81/2069* (2013.01); *B65D 81/22* (2013.01); *B01D 53/22* (2013.01); *B01D 2053/221* (2013.01)

(58) Field of Classification Search
  CPC ............... B01D 63/066; B01D 65/006; B01D 67/0097; B01D 71/028
  USPC .................................. 206/204, 213.1; 96/10
  See application file for complete search history.

(56) References Cited

U.S. PATENT DOCUMENTS

| | | | | |
  |---|---|---|---|---|
  | 5,467,873 | A | * | 11/1995 | Kastenhofer ....... A61M 25/002 206/363 |
  | 2004/0173094 | A1 | | 9/2004 | Nakayama et al. |
  | 2004/0187690 | A1 | | 9/2004 | Suzuki |
  | 2005/0058597 | A1 | | 3/2005 | Corbin et al. |
  | 2005/0229779 | A1 | | 10/2005 | Nakayama et al. |
  | 2008/0069950 | A1 | * | 3/2008 | Tanaka ................. B01D 63/066 427/246 |
  | 2009/0110907 | A1 | * | 4/2009 | Jiang .................... B01D 53/228 428/315.9 |
  | 2011/0092362 | A1 | | 4/2011 | Furuya et al. |
  | 2012/0077080 | A1 | * | 3/2012 | Liu ....................... H01G 11/06 429/206 |
  | 2014/0208707 | A1 | | 7/2014 | Teranishi et al. |
  | 2015/0151242 | A1 | * | 6/2015 | Nagano ................. B01D 69/12 95/53 |
  | 2017/0291143 | A1 | * | 10/2017 | Zhou ..................... B01D 61/36 |

FOREIGN PATENT DOCUMENTS

| | | |
  |---|---|---|
  | JP | 2003-286018 A1 | 10/2003 |
  | JP | 2004-066188 A1 | 3/2004 |
  | JP | 2005-066389 A1 | 3/2005 |
  | JP | 3933907 B2 | 6/2007 |
  | JP | 3953833 B2 | 8/2007 |
  | JP | 4006107 B2 | 11/2007 |
  | JP | 2011-136758 A1 | 7/2011 |
  | WO | WO2013/054794 A1 | 4/2013 |

OTHER PUBLICATIONS

Chinese Office Action (Application No. 201580055631.6) dated Jul. 31, 2018 (with English translation).
  International Search Report and Written Opinion (Application No. PCT/JP2015/081056) dated Feb. 2, 2016.
  Japanese Office Action (with English translation), Japanese Application No. 2016-557776 dated Oct. 1, 2019 (10 pages).

* cited by examiner

PACKAGE, METHOD FOR STORING OR TRANSPORTING SUB-NANO MEMBRANE STRUCTURE, AND SUB-NANO MEMBRANE STRUCTURE

FIELD OF THE INVENTION

The present invention relates to a package including a sub-nano membrane structure, a method for storing or transporting the sub-nano membrane structure, and the sub-nano membrane structure.

BACKGROUND ART

Since a ceramic filter provided with a zeolite membrane formed on a porous support exhibits superior mechanical strength and durability compared to a polymer membrane, it is suitable for liquid separation and gas separation (For example, reference is made to PCT Laid Open Application 2013/054794 and Japanese Patent Application Laid-Open No. 2011-136758).

In this context, a technique has been proposed for the storage or transportation in a fixed state of the ceramic filter in packing trays to suppress damage due to vibration.

SUMMARY OF INVENTION

Technical Problem

However, during transportation and storage, there is a risk of a reduction in the membrane performance of zeolite membrane as a result of attachment of organic matter or moisture to the zeolite membrane.

This problem is not limited to zeolite membranes, and may occur in relation to a sub-nano membrane having an average pore diameter of less than or equal to 1 nm.

The present invention is proposed based on the new insight above, and has the object of providing a package that enables a reduction in the membrane performance of the sub-nano membrane structure to be suppressed, a method of storage or transportation of the sub-nano membrane structure, and the sub-nano membrane structure.

The package according to the present invention comprises an airtight container having oxygen permeability of less than or equal to 15 ml/m$^2$dMPa and water vapor permeability of less than or equal to 2 g/m$^2$d, and a sub-nano membrane structure accommodated in the airtight container. The sub-nano membrane structure comprises a porous support and a sub-nano membrane formed on the porous support and having an average pore diameter of less than or equal to 1 nm.

Advantageous Effects of Invention

According to the present invention, it is possible to provide a package that suppresses a reduction in the membrane performance of the sub-nano membrane structure, a method of storage or transportation of the sub-nano membrane structure, and the sub-nano membrane structure.

DETAILED DESCRIPTION OF THE INVENTION

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

1. First Embodiment

Figure 1:
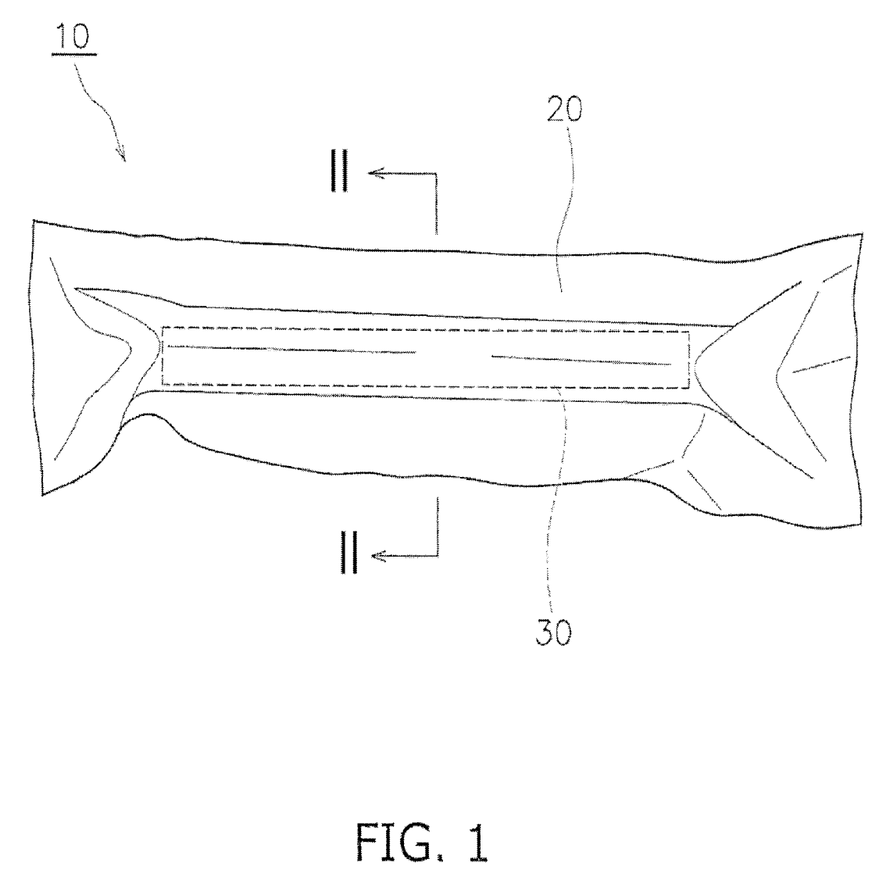
FIG. 1 is an external view showing a configuration of a package according to a first embodiment.
Figure 2:
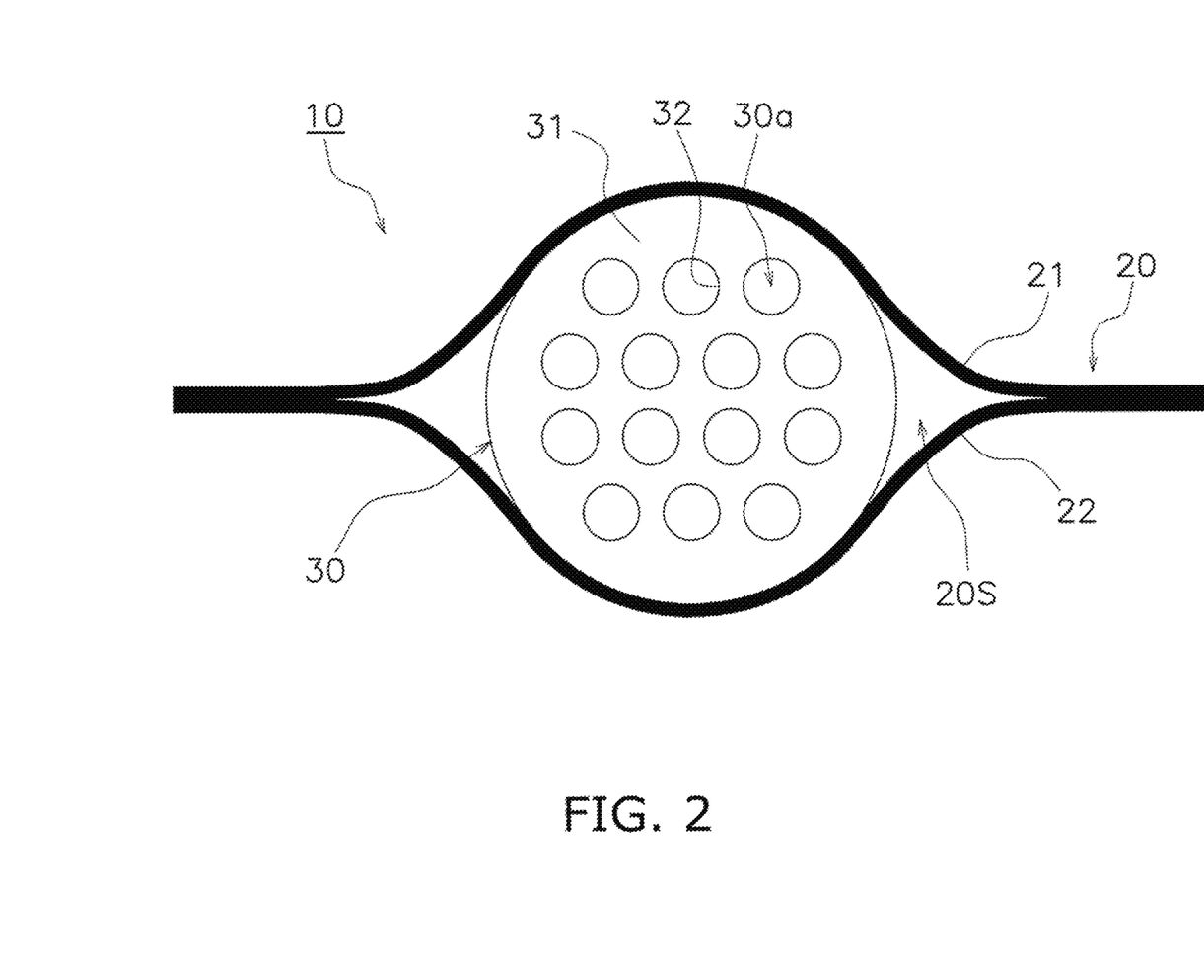
FIG. 2 is a cross-sectional view along II-II in FIG. 1.

FIG. 1 is an external view showing a configuration of a package according to a first embodiment. FIG. 2 is a cross-sectional view along II-II in FIG. 1.

The package 10 includes an airtight container 20 and a sub-nano membrane structure 30. The package 10 is retained in a state that separates the outside air from the sub-nano membrane structure 30 that is the object to be packed. Therefore, the package 10 is suitable for transportation and storage of the sub-nano membrane structure 30.

Configuration of Airtight Container 20

The airtight container 20 is a container for airtight storage of the sub-nano membrane structure 30. The airtight container 20 according to the present embodiment is formed in a bag shape. The airtight container 20 exhibits air-tight and liquid-tight characteristics. Oxygen permeability of the airtight container 20 is less than or equal to 15 ml/m$^2$dMPa and is preferably less than or equal to 10 ml/m$^2$dMPa. Low oxygen permeability means that penetration of organic matter from the outside is suppressed. Water vapor permeability of the airtight container 20 is less than or equal to 2 g/m$^2$d, and is preferably less than or equal to 1 g/m$^2$d.

The airtight container 20 according to the present embodiment is configured by a first sheet 21 and a second sheet 22. The entire outer periphery of the first sheet 21 and the second sheet 22 is thermally fused (heat-sealed). In this manner, an airtight space 20S for accommodating the sub-nano membrane structure 30 is formed on the inside of the airtight container 20. Although atmospheric air may fill the airtight space 20S, it is preferred that it is filled by an inert gas (such as nitrogen or argon, or the like), or is in a vacuum state (preferably less than or equal to −0.1 kPa). It is preferred that an adsorption material that is configured to adsorb active gases and an adsorption material that is configured to adsorb moisture are disposed in the airtight space 20S.

Figure 3:
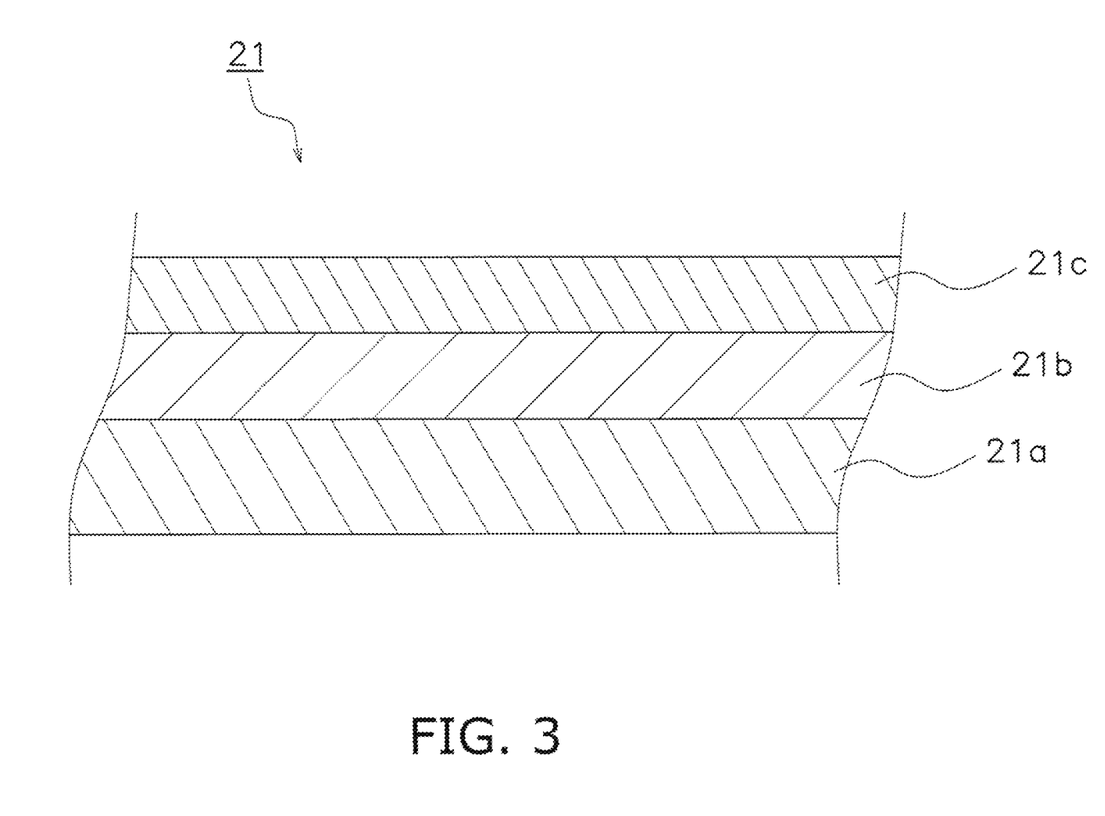
FIG. 3 is an enlarged cross-sectional view of the airtight container.

In this context, FIG. 3 is an enlarged sectional view of the first sheet 21. The first sheet 21 according to the present embodiment has a configuration in which a first synthetic resin layer 21a, a protective layer 21b and a second synthetic resin layer 21c are stacked in order from an inner side. The second sheet 22 has the same configuration as the first sheet 21.

The first synthetic resin layer 21a is the innermost layer of the airtight container 20. The first synthetic resin layer 21a makes contact with the sub-nano membrane structure 30. There is no particular limitation in relation to the synthetic resin that configures the first synthetic resin layer 21a, and includes nylon (NY, polyamide (PA)), polyethylene (PE), polypropylene (PP), polyethylene terephthalate (PET), polyvinyl chloride (PVC), polyvinylidene chloride (PVDC), polyvinyl alcohol (PVA), polycarbonate (PC), polystyrene (PS), polyacrylonitrile (PAN), ethylene-vinyl acetate copolymer (EVA), ethylene-vinyl alcohol copolymer (EVOH), ethylene-methacrylic acid copolymer (EMAA), polyethylene naphthalate (PEN), polyester, cellophane, imides, and the related polymers.

Although there is no particular limitation in relation to the thickness of the first synthetic resin layer 21a and it may be configured for example as 5 µm~500 µm, upon consideration of strength (resistance to tearing), handling characteristics and cost, 10 µm~200 µm is preferred. It is generally the case that when there is an increase in thickness, although there is an increase resistance to tearing, there is a tendency for a reduction in the sealing performance, and when there is a reduction in thickness, handling characteristics are enhanced and there is a tendency for costs to be reduced. There is no particular limitation in relation to the size of the first synthetic resin layer 21a as long as the sub-nano membrane structure 30 is covered.

The protective layer 21b is formed on the first synthetic resin layer 21a. The protective layer 21b according to the present embodiment is sandwiched between the first synthetic resin layer 21a and the second synthetic resin layer 21c. The protective layer 21b blocks outside light and enhances the airtight characteristics of the airtight container 20.

The protective layer 21b may be formed by depositing a metal material or a ceramic material on the outer surface of the first synthetic resin layer 21a. The metallic material for example includes aluminum, chromium, zinc, gold, silver, platinum, nickel or the like. The ceramic material for example includes alumina, silica or the like. The deposition method for forming the protective layer 21b includes use of physical vapor deposition or chemical vapor deposition (plasma CVD or thermal CVD). There is no particular limitation in relation to the thickness of the protective layer 21b and it may be configured for example to 10 nm~100 nm and preferably 10 nm~50 nm.

The second synthetic resin layer 21c is disposed on the protective layer 21b. The second synthetic resin layer 21c is the outermost layer of the airtight container 20. The second synthetic resin layer 21c makes contact with the outside air. There is no particular limitation in relation to the synthetic resin that configures the second synthetic resin layer 21c and includes use of the same material as the first synthetic resin layer 21a described above. Although there is no particular limitation in relation to the thickness of the second synthetic resin layer 21c which for example may be configured for example to 5 µm~30 µm, it may be set in consideration of strength (resistance to tearing), handling characteristics and cost.

Configuration of the Sub-Nano Membrane Structure 30

The sub-nano membrane structure 30 as shown in FIG. 2 comprises a porous support 31 and a sub-nano membrane 32.

The porous support 31 exhibits chemical stability sufficient for the formation in a membrane configuration of the sub-nano membrane 32 on the surface (for example, by crystallization or precipitation). The material used to configure the porous support 31 includes, for example, a ceramic sintered body, metals, organic polymers, glass, carbon or the like. The ceramic sintered body includes alumina, silica, mullite, zirconia, titania, yttria, silicon nitride, silicon carbide, or the like. The metal includes aluminum, iron, bronze, silver, stainless steel or the like. The organic polymer includes polyethylene, polypropylene, polytetrafluoroethylene, polysulfone, polyimide, or the like.

The porous support 31 according to the present embodiment is formed in a monolithic shape. That is to say, the porous support 31 has a plurality of through holes 30a connecting both end faces of a cylindrical body. Both end faces of the porous support 31 are preferably covered by a glass seal. However, the porous support 31 may be configured in a shape to enable supply to the sub-nano membrane 32 of a gas mixture or liquid mixture that is the object to be separated, and for example may be configured in a flat, tubular, cylindrical, columnar, or square column shape.

The porous support 31 is a porous body that has pores. The average pore diameter of the porous support 31 may be any size that enables transmission of a permeation component that permeates the sub-nano membrane 32. The porous support 31 may be a single-layered structure or a multilayered structure having different average pore diameters. When the porous support 31 is a multilayered structure, each layer may be composed of different materials from among the materials described above or may be composed of the same material.

The sub-nano membrane 32 is formed on the surface of the porous support 31. In the present embodiment, since the porous support 31 is formed in a monolithic state, the sub-nano membrane 32 is formed on the inner surface of each through hole 30a.

The sub-nano membrane 32 has an average pore diameter of less than or equal to 1 nm. The sub-nano membrane 32 is a gas separation membrane, an osmotic evaporating membrane used in osmotic evaporation methods, or a vapor permeation membrane used in the vapor permeation methods. Examples of the sub-nano membrane 32 include a known carbon monoxide separation membrane (reference is made for example to Japanese Patent No. 4006107), a helium separation membrane (reference is made for example to Japanese Patent No. 3953833), a hydrogen separation membrane (reference is made for example to Japanese Patent No. 3933907), a carbon membrane (reference is made for example to Japanese Patent Publication Laid-Open No. 2003-286018), a zeolite membrane (reference is made for example to Japanese Patent Publication Laid-Open No. 2004-66188), a silica membrane (reference is made for example to the pamphlet of PCT Laid Open Application 2008/050812), or the like. In particular, a DDR-type zeolite membrane is suitable as the sub-nano membrane 32 when separation accuracy and corrosion resistance are considered.

Produced Amount of Organic Matter from Sub-Nano Membrane Structure 30

As described above, the sub-nano membrane structure 30 suppresses adsorption of organic matter since it is accommodated in the airtight container 20 that exhibits oxygen permeability of less than or equal to 15 ml/m$^2$d MPA.

More specifically, after heating the sub-nano membrane structure 30 for 8 hours at 80 degrees C., the produced amount of organic substance is suppressed to less than or equal to 0.2 g/m$^2$. The produced amount of the organic substance is a value obtained by dividing the mass of organic matter produced during heating by the surface area of the sub-nano membrane 32. The produced amount of the organic substance is an organic amount adsorbed on the sub-nanometer membrane 32, and a low production amount of organic material means that the airtight characteristics of the airtight container 20 are high.

Further, since the sub-nano membrane structure 30 is accommodated in the airtight container 20 that exhibits a water vapor permeability of less than or equal to 0.2 g/m², adsorption of moisture into the sub-nano membrane structure 30 is also suppressed.

As described above, since adsorption of moisture and organic material into the sub-nano membrane structure 30 is suppressed by the airtight container 20, long-term maintenance of the basic membrane characteristics of the sub-nano membrane 32 is enabled.

2. Second Embodiment

A package according to a second embodiment will he described below. The point of difference from the package according to the first embodiment resides in the feature that the airtight container 60 is a rigid metal module. The description below will mainly focus on the point of difference.

Configuration of Airtight Container 60

Figure 4:
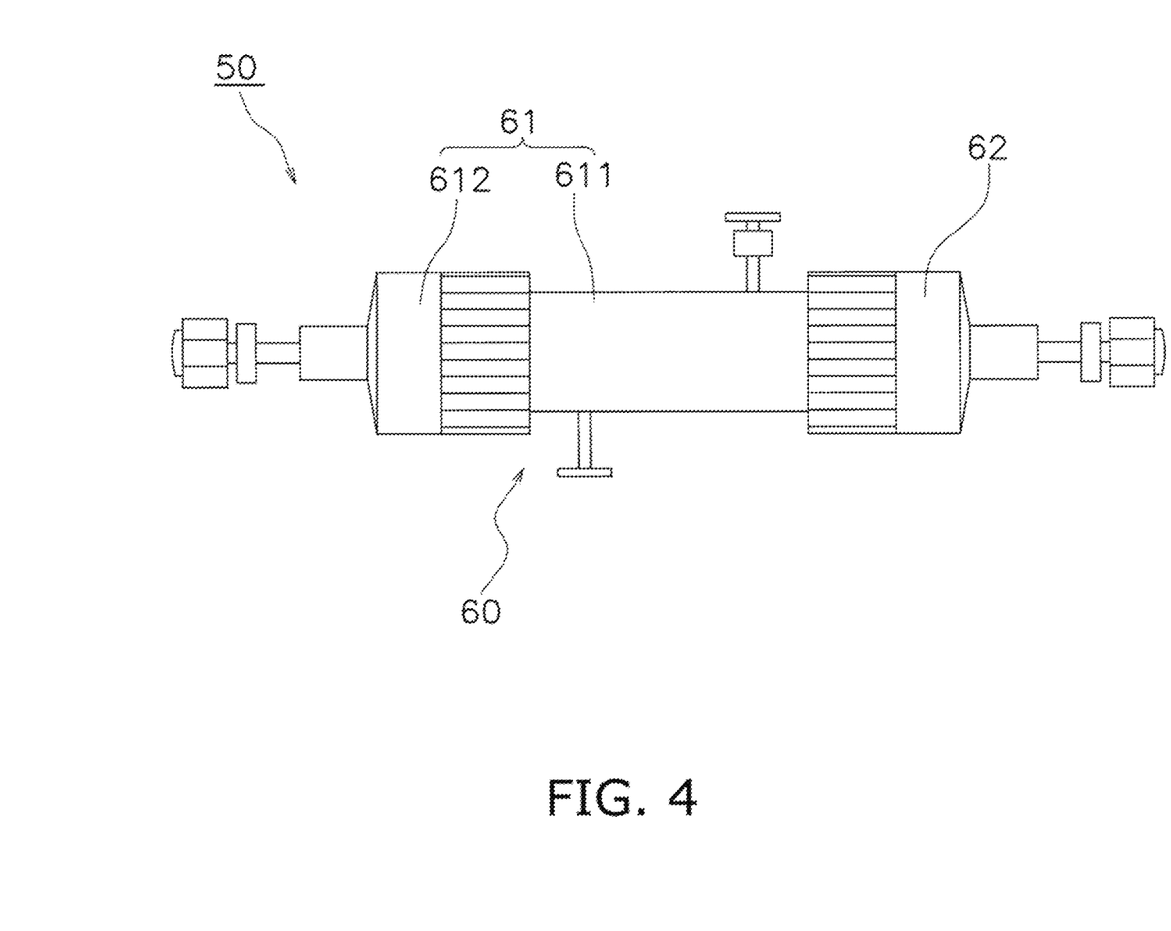
FIG. 4 is an external view showing a configuration of the airtight container according to a second embodiment.
Figure 5:
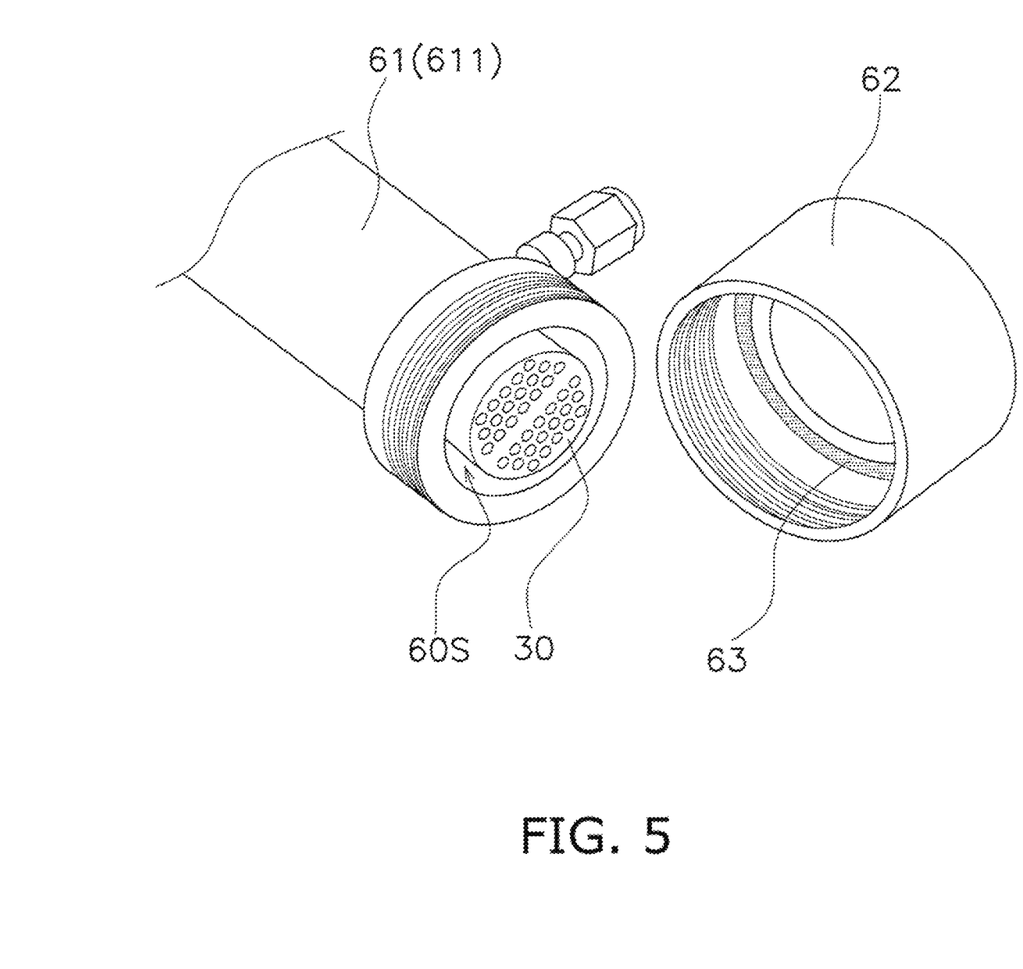
FIG. 5 is an external view showing an open state of the airtight container according to the second embodiment.

FIG. 4 is an external view showing a configuration of an airtight container 60 according to the second embodiment. FIG. 5 is an external view showing an open state of the airtight container 60. In FIG. 5, the sub-nano membrane structure 30 is also illustrated accommodated in the airtight container 60.

The airtight container 60 includes a housing portion 61 (first portion), a cover 62 (second portion), and an O-ring 63 (sealing member).

The housing portion 61 includes a cylindrical tubular portion 611 and a cover-shaped sealing portion 612. The sealing portion 612 seals the end portion of the cylindrical portion 611. The housing portion 61 has an airtight space 60S for housing the sub-nano membrane structure 30. Although the airtight space 60S may be filled with air, filling with an inert gas or a vacuum state is preferred. It is preferred that an adsorption material to adsorb active gases and an adsorption material to adsorb moisture are disposed in the airtight space 60S.

The housing portion 61 is constituted by a metal material. There is no particular limitation in relation to the metal material and it includes for example use of stainless steel, aluminum, steel or the like.

The cover 62 is connected to the housing portion 61 to thereby close the opening of the housing portion 61. The cover 62 according to this embodiment is connected to the housing portion 61 by a screw.

The O-ring 63 is attached to the inner side of the cover 62. When the cover 62 is threadably attached to the housing portion 61, the O-ring 63 is sandwiched between the housing portion 61 and the cover 62. In this manner, the O-ring 63 seals the gap between the housing portion 61 and the cover 62. The O-ring 63 may be configured from a nitrile rubber, a fluorocarbon rubber (Viton), styrene-butadiene, a fluorine-based rubber, and a perfluoro rubber, or the like.

The oxygen permeability of the airtight container 60 having the above structure is less than or equal to 15 ml/m²dMPa and the water vapor permeability is less than or equal to 2 g/m²d. Accordingly, since the adsorption of organic matter and moisture to the sub-nano membrane structure 30 is sufficiently suppressed by the airtight container 60, long-term maintenance of the basic membrane characteristics of the sub-nano membrane 32 is enabled.

3. Other Embodiments (1) In the first embodiment, the airtight container 20 is configured by the first synthetic resin layer 21a, the protective layer 21b and the second synthetic resin layer 21c. However there is no limitation in this regard. A configuration using a single synthetic resin layer may be used to the extent that the airtight container 20 maintains oxygen permeability of less than or equal to 15 ml/m²d MPA and water vapor permeability of less than or equal to 2 g/m²d. Furthermore the airtight container 20 may be provided with a plurality of protective layers.

(2) In the first embodiment above, although the entire circumference of the first synthetic resin layer 21a is heat-sealed, when the first synthetic resin layer 21a is formed in a bag shape, a configuration is possible in which airtight characteristics are maintained by only heat sealing a portion of the outer periphery.

(3) In the second embodiment, the airtight container 60 is provided with the housing portion 61 and the cover 62. However there is no limitation in this regard. It is sufficient if the airtight container 60 enables sealing of the sub-nano membrane structure 30 by connecting two members (the first portion and second portion), and for example may be configured by two cup-like members having the same shape.

Figure 6:
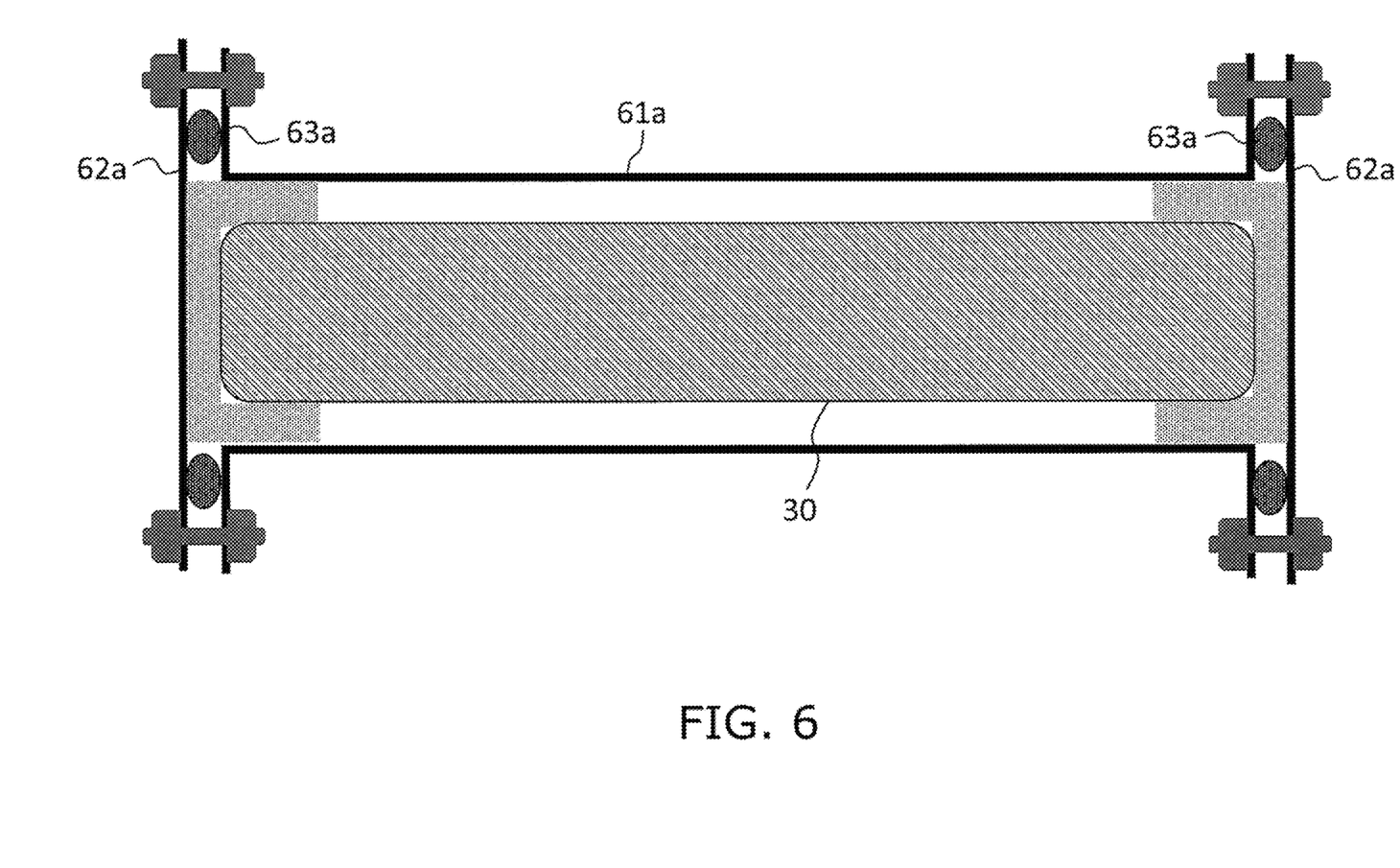
FIG. 6 is a sectional view showing a configuration of the airtight container.
Figure 7:
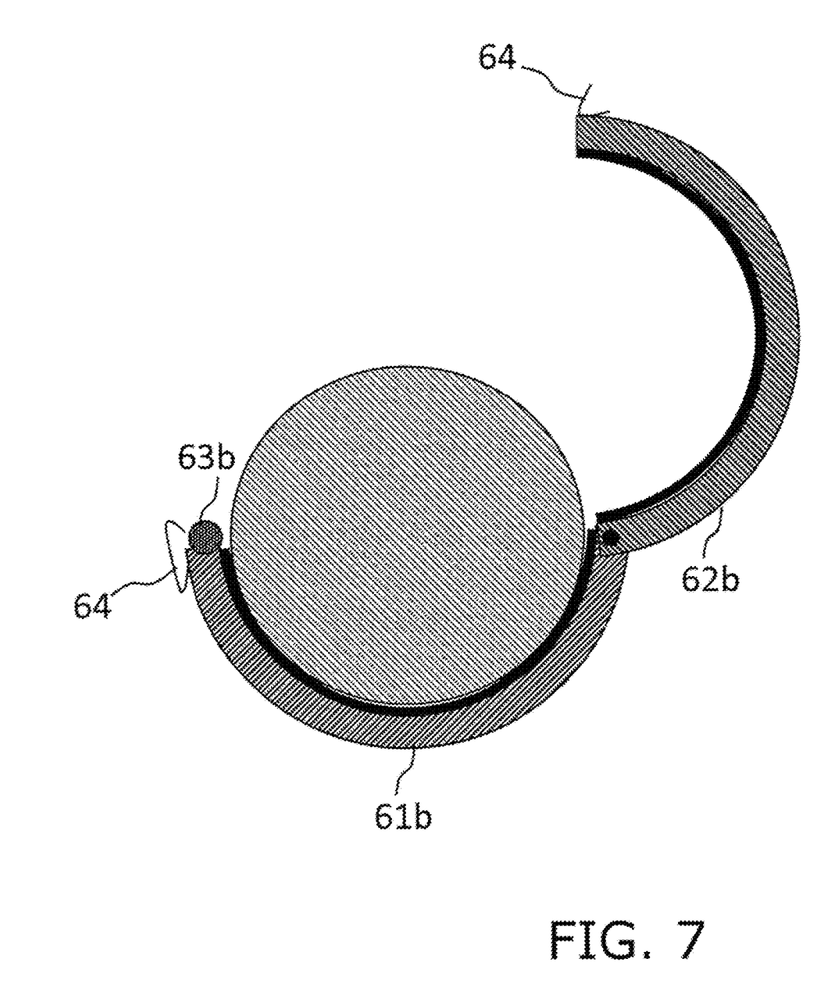
FIG. 7 is a sectional view showing a configuration of the airtight container.

(4) In the second embodiment above, the cover 62 is connected to the housing portion 61 by a screw. However there is no limitation in this regard. For example, as shown in FIG. 6, the cover 62a (second portion) may be fixed via the O-ring 63a to a flange portion formed at both ends of the housing portion 61a (first portion). Furthermore, as shown in FIG. 7, the cover 62b (the second portion), that is connected to the housing portion 61b (first portion) to be opened on a hinge, may be fixed with a clamp 64 through the O-ring 63b.

(5) In the second embodiment above, the housing portion 61 is configured to have a cylindrical tubular portion 611 and a cover-shaped sealing portion 612. However, as long as the housing portion 61 forms the airtight space 60S, there is no particular limitation in relation to the shape. Therefore, the housing portion 61 may be formed for example into a cup shape.

EXAMPLES

Examples of a package according to the present invention will be described below. However, the present invention is not limited to the examples that are described below.

Samples No. 1 to No. 10

Firstly, an alumina monolithic support is prepared. Then, a sub-nano membrane structure forming a DDR-type zeolite membrane on an inner surface of each through hole is prepared using the method disclosed in Japanese Patent Application Laid-Open No. 2004-083375.

Then, the airtight container shown in Table 1 is prepared. As shown in Table 1, Sample Nos. 1 to 3 and 5 to 7 are bags having a multilayered structure. Sample No. 4 is a stainless steel module having the configuration shown in FIG. 4, Sample No. 9 is a bag having a single-layer structure, and Sample No. 10 is a PP container (tight box). Sample No. 8 did not use an airtight container.

Next, the oxygen permeability of those samples in which a bag is configured as the airtight container is measured using a differential pressure method according to JIS K7126. Next, the water vapor permeability of those samples in which a bag is configured as the airtight container is measured with reference to JIS K7129. The measurement results are shown in Table 1.

Then sub-nano membrane structures are respectively accommodated in each airtight container.

Air Transportation Simulation of Package

The following simulation was performed to confirm the membrane performance maintenance rate when the sample is transported by air.

First, a permeation coefficient is calculated by supplying $CO_2$ gas to each sub-nano membrane structure in order to measure the membrane performance of each sample.

Then, each sample is placed in a sealed box, and the interior of the box is configured to a standard condition (100 kPa, 298.15K).

Then, an organic substance (organic material containing two or more carbon atoms per molecule) is introduced into the box. At that time, at least 0.4 g of the organic substance per unit surface area of the DDR-type zeolite membrane is introduced to thereby confirm the reduction in membrane performance.

Then, after the pressure is maintained at 200 hPa at a temperature of −15 degrees C. for 24 hours, the temperature is maintained for 24 hours at 80 degrees C.

Next, a permeation coefficient is calculated by supplying $CO_2$ gas to each sub-nano membrane structure in order to perform another measurement of the membrane performance for each sample. The ratio of the permeation coefficient after the simulation to the permeation coefficient before the simulation is shown in Table 1 as a membrane performance maintenance rate.

Produced Amount of Organic Matter from Sub-Nano Membrane Structure

After the air transportation simulation, the sub-nano membrane structure of each sample is heated for 8 hours at 80 degrees C., and the mass of organic matter produced during heating is measured. Then, the produced amount of organic matter per membrane surface area is calculated by dividing the mass of organic matter by the surface area of the sub-nanometer membrane. The calculation results are shown in Table 1.

As shown in Table 1, the membrane performance of the package in Sample Nos. 1 to 7 which uses an airtight container exhibiting oxygen permeability of less than or equal to 15 ml/m²dMPa and water vapor permeability less than or equal to 2 g/m²d is maintained before and after the simulation. This is due to the fact that adsorption of organic matter and moisture into the sub-nano membrane structure is suppressed since the airtight characteristics of the airtight container are sufficient. This feature is consistent with the low produced amount of organic matter in Sample Nos. 1 to 7.

In addition, a particularly low amount of organic matter produced from the sub-nano membrane structure is evident Sample No. 3 that configures the housing space in a vacuum atmosphere, Sample No. 5 that places a gas adsorbing agent in the housing space and Sample No. 7 that configures the housing space with a nitrogen (inert gas) atmosphere.

Although Sample No. 1 to No. 10 use a DDR-type zeolite membrane as the sub-nano membrane, a similar effect has been experimentally confirmed with respect to use of a silica membrane or a carbon membrane.

The invention claimed is:

1. A package comprising;
   an airtight container having an oxygen permeability of less than or equal to 15 ml/m²dMPa and water vapor permeability of less than or equal to 2 g/m²d, and
   a sub-nano membrane structure accommodated in the airtight container,
   the sub-nano membrane structure having a porous support and a sub-nano membrane,
   the sub-nano membrane formed on the porous support and having an average pore diameter of less than or equal to 1 nm.

2. The package according to claim 1, wherein the airtight container is a synthetic resin bag.

3. The package according to claim 2, wherein an opening of the airtight container is thermally fused.

4. The package according to claim 2, wherein the airtight container includes a protective layer formed on a synthetic resin layer, and the protective layer is configured by a metal or a ceramic.

5. The package according to claim 1, wherein the airtight container has
   a first metal portion,
   a second metal portion, and
   a sealing member configured to seal a space between the first portion and the second portion.

6. The package according to claim 5, wherein the first portion and the second portion are configured from stainless steel.

TABLE 1

| Sample No. | Airtight Container Configuration | Sealing Method | Atmosphere of Housing Space | Oxygen Permeability (ml/m²dMPa) | Water Vapor Permeability (g/m²d) | Membrane performance Maintenance Rate (%) | Produced Amount of Organic Matter (g/m²) |
|---|---|---|---|---|---|---|---|
| 1 | Nylon Layer/Aluminum Vapor Deposition Layer/LLDPE Layer | Heat Seal | Air | 10 | 0.5 | 96 | 0.18 |
| 2 | Nylon Layer/PE + Ceramic Vapor Deposition Layer/LLDPE Layer | Heat Seal | Air | 15 | 2 | 100 | 0.17 |
| 3 | PET Layer/PE Layer/Aluminum Vapor Deposition Layer/PE Layer | Heat Seal | Vacuum | 1 | 0.01 | 100 | 0.10 |
| 4 | Stainless Steel Module | O-Ring | Air | — | — | 100 | 0.15 |
| 5 | Nylon Layer/PE + Ceramic Vapor Deposition Layer/LLDPE Layer | Heat Seal | Air and Gas Absorbing Material | 15 | 2 | 100 | 0.10 |
| 6 | Nylon Layer/PE + Ceramic Vapor Deposition Layer/LLDPE Layer | Heat Seal | Air and Moisture Absorbing Material | 15 | 2 | 100 | 0.16 |
| 7 | Nylon Layer/PE + Ceramic Vapor Deposition Layer/LLDPE Layer | Heat Seal | Nitrogen | 15 | 2 | 100 | 0.10 |
| 8 | None | | | — | — | 0 | 0.74 |
| 9 | LLPE Layer | Heat Seal | Air | 90000~100000 | 16~22 | 0 | 0.43 |
| 10 | PP Container | Rubber Packing | Air | 10000 | 1.6 | 30 | 0.21 |

7. The package according to claim 1, wherein the airtight container is in a vacuum state.

8. The package according to claim 1, wherein an inert gas is used to fill the airtight container.

9. The package according to claim 1 further comprising;
an adsorption material accommodated in the airtight container, and configured to adsorb moisture or gas.

10. The package according to claim 1, wherein the sub-nano membrane is a gas-separation zeolite membrane.

* * * * *